March 20, 1928.
J. F. WHITE
1,662,909
SEALING CAP FOR AUTOMOBILE RADIATORS
Filed May 31, 1924
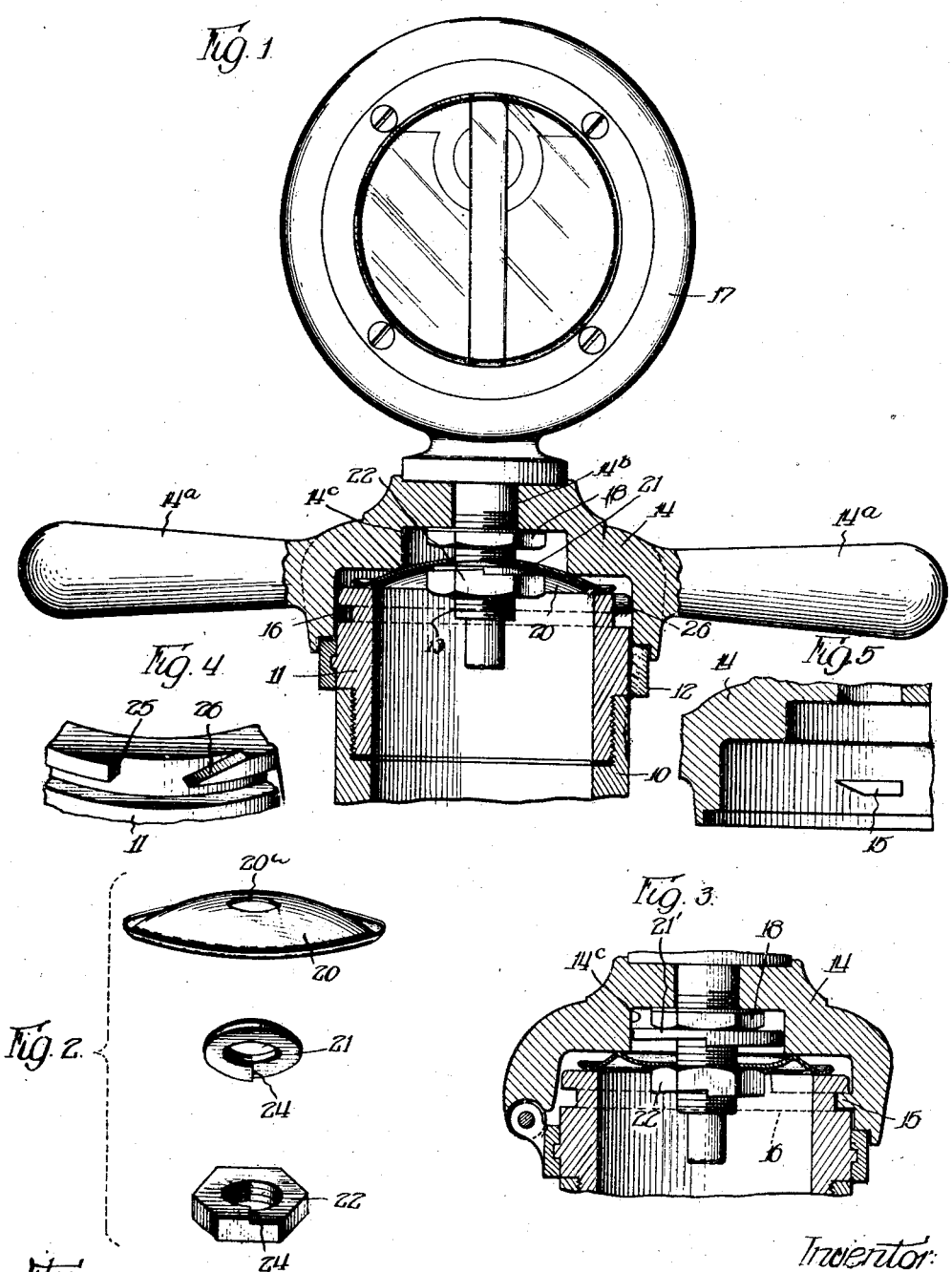
Inventor:
John F. White, Patented Mar. 20, 1928.

1,662,909

UNITED STATES PATENT OFFICE.

JOHN F. WHITE, OF CHICAGO, ILLINOIS, ASSIGNOR TO WHITE PRODUCTS COMPANY, OF CHICAGO, ILLINOIS, A CORPORATION OF ILLINOIS.

SEALING CAP FOR AUTOMOBILE RADIATORS.

Application filed May 31, 1924. Serial No. 716,861.

This invention relates particularly to closures and mountings designed for use on automobile radiators, their function being to form a tight closure for the radiator filling tube, an ornamental attachment for the vehicle and a theft preventing device for frustrating unauthorized removal of indicating instruments or ornaments sometimes carried on the radiator cap.

The present invention has for its particular objects the improvement of the sealing or closure forming features of devices of this kind, and the improvement and simplification of the theft preventing locking means or fastening whereby the indicating device or ornament is retained.

One of the specific objects of the present improvement is the provision of a sealing means which is not subject to deterioration to the extent or with the rapidity which characterizes forms now in use, and one in which the degree of compression between the seal forming members may be varied selectively, so that a properly tight seal may be maintained at all times and the relatively movable parts of the device retained against rattling.

Another important feature of the present invention is the simpification of the construction, which results in substantial saving in the cost of production.

Other and further objects of the invention will be pointed out hereinafter, indicated in the appended claims or obvious upon an understanding of the present disclosure. In the drawing forming a part of this specification I have illustrated two fashions in which the invention may be embodied, the same being predicated on a structure disclosed and claimed in my co-pending application Serial No. 700,803, filed March 21, 1924. It is to be understood, however, that the two particular forms herein disclosed are presented for the purpose of illustration only and hence are not to be regarded as exhaustive of the scope of the invention. Nor is it to be understood that the present improvements are susceptible of use only with the particular form of radiator cap illustrated.

In the drawing,

Fig. 1 is a part sectional elevation of an automobile radiator cap containing my invention, same being shown mounted on an automobile radiator filling tube and employed as a securing means for an indicating instrument known in the trade as a motometer;

Fig. 2 is a composite illustration of various portions of the structure, same being shown in perspective; and Fig. 3 is a part sectional elevation similar to Fig. 1 but showing a different embodiment of the invention.

Fig. 4 is a detail in the nature of a fragmentary perspective of the bushing;

Fig. 5 is a detail in the nature of a fragmentary sectional elevation of the cap, showing the locking lug.

The nature of the invention will best be understood by reference immediately to the illustrative forms. In the drawing, it will be understood that the numeral 10 designates a portion of the filling tube or nipple of an automobile radiator, which is internally screw-threaded for connection of a closure cap in the customary fashion. The closure attachment includes a tubular bushing 11 which is threaded for screw engagement with the nipple 10 and affords a portion standing above the upper margin of the nipple. Upon this bushing is rotatably retained a connecting ring or collar 12 and to this is hinged a closure cap 14 adapted, when in closed position upon the bushing 11, to house and form a closure for the upper end thereof. Means are provided for holding the cap 14 closed upon the bushing 11, same being in the nature of a lug 15 projecting at the interior of the cap and adapted to engage in a bayonet slot 16 in the peripheral portion of the bushing, retentive engagement of the lug 15 therein being accomplished by rotation of the cap upon the bushing. The cap is provided with laterally extending arms 14ª which constitute decorative features as well as operating handles whereby the cap may be rotated for connection of the device to the nipple in the first instance, as well as for locking and unlocking and swinging of the cap to and from the closed position. The cap is provided with the axial aperture 14ᵇ accommodating the stem or post 13 of the indicating device 17, or other ornamental attachment.

The structure thus far described is the improved form of device forming the subject-matter of my co-pending application above referred to, and which is described more in detail in said application. It will be understood from the foregoing description however, that the said device is intended to constitute a permanent attachment for the automobile radiator, such as will baffle removal in the absence of the use of appropriate tools. Attempts to back the threaded bushing off of the nipple by rotation of the cap will be effective simply to disengage the retaining means 15 from the slot 16 and thereafter permit the free rotation of the cap and ring 12 upon the bushing.

While it is of advantage that the radiator cap permit the quick opening of the nipple, for the purpose of inspection or filling of the radiator, it is quite important that it form a tight closure so as to prevent steam leakage and, from both æsthetic and practical standpoints, that it stay in proper position to present the arms and the attached ornament or indicating instrument in the proper directions. It has been quite common to use elastic sealing gaskets of rubber or the like in devices of this kind, with the gasket retained on the collar or bushing through which the radiator is filled. Experience has proved, however, that such expedients have certain serious drawbacks, due to the rapidity with which the relatively narrow gaskets of rubber and like elastic materials disintegrate under the heat, moisture and vibration to which they are subjected in such assembly, and particularly when subjected to the liquids used as anti-freezing mixtures, or the vapors produced from them in the radiator. It the present improvement the cap is provided with a recess 14° which receives the securing nut 18 for the motometer. For the sealing disk 20 I prefer to use a suitable resilient non-corrosive metal, such as bronze, of slightly dished form and of such size as to fit within the cap and bear against the corner about the recess 14° when the stem of the motometer is threaded through its axial aperture 20ª. The peripheral portion of the disk 20 is of such shape and size as to bear upon the upper edge of the bushing 11 when the cap is in closed position, the contact of said parts forming a tight closure under the resilient pressure of the sealing disk. The disk is held in place by an adjustable locking device in the nature of a divided nut, or interlocking threaded washer and nut. The portion which I will term the washer is designated by the numeral 21 and the portion which I will designate the nut by the numeral 22. These are both internally screwthreaded to mesh with the thread on the post or stem of the supported instrument. The washer is preferably of circular contour, and slightly domed at its upper side so as to take the curving contour of the sealing disk and present a very narrow peripheral margin. The lower side of the washer and the upper side of the nut are progressively spiraled so as to form interlocking portions 24 and 24', which interengage when the two are screwed on to the post so that the necessary rotary movement may be transmitted to the washer from the nut, the form of the latter being such that it may be operated by a wrench. In this fashion the washer is forced up tight against the sealing disk 20, clamping the latter against the peripheral corner of the recess 14° so as to tension the marginal portion of the disk toward the bushing. In addition to this tensioning function, the locking device affords a theft preventing connection, as when the nut is backed off the washer remains in place, and can be removed only with considerable difficulty and by the use of tools. Loosening of the washer by rotation of the retained display device is prevented by the nut 18, which is drawn up very tightly in the first instance. In the event the disk 20 loses some of its resiliency or becomes worn, incident to long use, so that the tightness of the seal is impaired, the condition may be completely remedied simply by tightening up the nut 22 and washer 21 so as to induce new tension in the disk, restoring the desired closeness of engagement between it and the bushing.

In the modification illustrated in Figure 3, the sealing disk is designated by the character 20'. Instead of being dished, it is formed with a concentric circular upwardly embossed rib 20ᵇ which bears upon the under surface of the closure cap about the recess 14° and forming a fulcrum point where the pressure induced in the interior of the disk is transmitted to the marginal sealing portion. A further modification is contained in this figure, which provides for the relieving as well as the increasing of the tension in the sealing disk. In this modification the diameter of the locking washer 21' is very nearly that of the recess 14° the nut 22' however being sufficiently smaller than the recess to give the necessary clearance for engagement of the nut by a wrench. Before the sealing disk is inserted, the locking washer and nut are turned up on the threaded stem of the display device, until the washer is jammed against the nut 18, where it acts as a locking jam nut. The nut 22' is then backed off, leaving the washer 21' in the recess 14°, which it so nearly fits that it cannot be engaged so as to be readily backed off. The sealing disk then being put in place, the nut 22' is reversed and screwed on to the stem below the spring disk to the extent requisite to give the latter the desired tension. In this arrangement the tension in the disk may be increased or decreased by the turning up or backing off of the nut, so that the desired degree of compression between the disk and the bushing may be attained. It may be desirable to thicken or to curve the marginal portion of the disk which contacts the bushing so as to attain an even and adjustable bearing and avoid scratching of the contacting surfaces. It will be appreciated that in addition to affording the desired tight seal, this construction provides a means effective to maintain the cap in the desired rotary position on the nipple.

Instead of being deteriorated by normal use, the closeness of the seal actually increases as the contacting parts wear upon one another, the desired compression being retained at all times by virtue of the adjustability of the tension in the sealing disk.

A further advantage of the present improvement resides in its automatic opening of the cap. When the lug 15 is rotated to a position under one of the upward openings of the bayonet slot, the spring effect exerted by the sealing disk 21 is effective to initiate upward swinging movement of the cap. Hence it is not necessary for the operator to hunt or feel about for the bayonet slot opening. This contributes also to a simplification of the bayonet slot. Whereas in the form illustrated in my aforementioned application, the slot is interrupted or terminated by an abutment, it will be observed that in the form of bushing here illustrated the bayonet slot is continuous about the bushing. This construction is of advantage in the manufacture of the bushing, as the continuous slot may be cut with much greater facility than the interrupted slot. In this form, for the purpose of screwing the bushing on to the filling tube, the abutment is provided at the left hand side of the bayonet slot opening, after the fashion of the abutment designated by the reference character 25. At the right hand side of the slot opening there is formed the incline 26. The locking lug 15 on the cap has the end which is presented toward the abutment 25 formed square, so that it will seat against that abutment when the cap is in a partially closed position, and thus permit the bushing's being screwed down on the filling tube by rotation of the cap. Such co-operation is not afforded when the cap is rotated in the opposite direction, however, as the other end of the lug 15 is formed on an incline and does not afford the necessary purchase upon the incline 26 to permit the bushing being backed off.

I claim:

1. An automobile radiator closure comprising the combination of a bushing for connection to the filling tube, a hinged cover for closing the end of the bushing, a resilient sealing device carried by the cover for co-operation with the bushing, and means for varying tension in the sealing device.

2. An automobile closure comprising the combination of a bushing for attachment to the filling tube, a hinged cover for closing the end of the bushing, a resilient sealing member carried by the cover and having a bearing portion for engagement with the bushing, and means for adjusting the bearing portion with respect to the cover.

3. An automobile radiator closure comprising the combination of a bushing for attachment to the filling tube, a hinged cover connected to the bushing for closing the same, a display device carried by the cover and having a post extending within the cover, a resilient sealing device carried by the cover to be stressed thereby against the bushing, and means co-operating with said post for adjusting the sealing device.

4. An automobile radiator closure comprising the combination of a bushing for attachment to the filling tube, a cover having hinged connection with the bushing, a resilient sealing device fulcrumed on the cover for co-operation with the bushing, and means adjustable on the cover for stressing the sealing device on its fulcrum.

5. An automobile radiator closure comprising the combination of a bushing for attachment to the filling tube, a cover connected to the bushing for rotary and oscillatory movement thereon, a resilient sealing device carried by the cover for co-operation with the bushing, and means on the cover for varying tension in the sealing device.

6. An automobile radiator attachment comprising the combination of a bushing for attachment to the filling tube, a cover having hinged connection with the bushing, a display device having a threaded post extending within the cover, a threaded washer and nut adjustable on the post, and connecting means on the washer and nut whereby the washer is rotated when the nut is turned up on the post but freed when the nut is backed off.

7. An attachment for automobile radiators comprising the combination of a cap, means for securing the same in hinged relationship on the filling tube, a resilient sealing disk carried by the cap, and means adjustable on the cap for flexing the disk to vary its sealing capabilities.

8. An automobile radiator closure comprising the combination of a tubular member, a cap hinged thereto, means on the cap and tubular member for securing them in closed relationship, a resilient sealing disk carried by the cap for sealing engagement with the tubular member and means on the cap for flexing the resilient sealing disk to vary the sealing compression.

9. An automobile radiator closure comprising the combination with a tubular member of a cap having hinged and rotary movement thereon, a resilient sealing disk in the cap for sealing cooperation with the tubular member, means for holding the cap in closed position on the tubular member with the sealing disk under compression, and means on the cap for adjusting the sealing disk to vary the sealing compression.

10. An automobile radiator attachment comprising the combination of a cap for hinged connection with the filling tube, a display device having a post extending through the cap, a washer having screw engagement with the post within the cap and a nut having operative engagement with the washer for rotation in one direction only.

11. An automobile radiator attachment comprising the combination of a cap for attachment to the filling tube, said cap having an internal recess, a display device having a post projecting into said recess, a resilient sealing disk covering the recess within the cap, and adjustable means cooperative with the post for flexing the central portion of the disk toward the top of the recess.

12. An automobile radiator attachment comprising a cap for hinged connection to the filling tube, a sealing disk within the cap and having its marginal portion spaced away from the cap, and adjustable means on the cap for varying the spacing of said portion relative to the cap.

13. In a device of the class described, a tubular member, a cap connected thereto for swinging and rotary movement, said tubular member having a circumferentially extending bayonet slot with an entrance toward the cap, the cap having a lug for engagement in the bayonet slot to secure the cap in closed position, said lug and tubular member being arranged for abutting engagement at one side of said entrance and for sliding co-operation at the other side thereof to induce opening movement of the cap.

14. An attachment for automobile radiators comprising the combination of a bushing for attachment to the filling tube, a cover connected with the bushing for hinged and rotary movement relative thereto, an elastic metallic sealing disc within the cover with its marginal portion arranged to be stressed in sealing cooperation with the bushing by the disk's own resiliency, and locking members engageable and disengageable by rotary movement of the cap for securing it in closed position on the bushing.

15. In a device of the class described, a bushing for attachment to a radiator spout, a cap connected to the bushing for rotary and swinging movement relative thereto, a resilient sealing disk carried by the cap for sealing cooperation with the bushing, and interlocking portions on the cap and bushing engageable on rotary movement of the cap for retaining them in closed relationship with the sealing member engaging the bushing under pressure of its own resiliency.

16. A device of the sort described, comprising a bushing for connection to the radiator nipple, a swinging cap for covering the end of the bushing, a hinge member connecting the cap and bushing and arranged for unlimited revolution on the latter in either circumferential direction, cooperating members on the cap and bushing for holding the former in closed position, said members being disengageable by rotation of the cap in either direction.

17. A device of the sort described, comprising a bushing for connection to the radiator nipple, a hinged cap for closing the end of the bushing, a hinge member arranged for unlimited revolution on the bushing in either circumferential direction and connecting the cap thereto, cooperating members on the cap and bushing engageable in one position to hold the bushing for clockwise rotation with the cap, said members engageable in another position to hold the cap closed on the bushing, said members being disengageable from the latter position by rotation of the cap in either direction.

In testimony whereof I have hereunto signed by name.

JOHN F. WHITE.